(12) United States Patent
Charania et al.

(10) Patent No.: US 9,094,698 B2
(45) Date of Patent: Jul. 28, 2015

(54) EFFICIENT BANDWIDTH UTILIZATION

(75) Inventors: Aamer Charania, Flower Mound, TX (US); Yuriy Bolyukh, Trophy Club, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 474 days.

(21) Appl. No.: 12/893,226

(22) Filed: Sep. 29, 2010

(65) Prior Publication Data

US 2012/0079545 A1    Mar. 29, 2012

(51) Int. Cl.
*H04L 12/24*    (2006.01)
*H04N 21/472*    (2011.01)
*H04N 21/61*    (2011.01)
*H04N 21/24*    (2011.01)

(52) U.S. Cl.
CPC .......... *H04N 21/2402* (2013.01); *H04L 41/509* (2013.01); *H04L 41/5054* (2013.01); *H04N 21/47202* (2013.01); *H04N 21/6175* (2013.01)

(58) Field of Classification Search
None
See application file for complete search history.

(56) References Cited

U.S. PATENT DOCUMENTS

| | | | | |
|---|---|---|---|---|
| 7,027,460 | B2 * | 4/2006 | Iyer et al. | 370/429 |
| 2009/0276803 | A1 * | 11/2009 | Weaver | 725/32 |
| 2011/0126245 | A1 * | 5/2011 | Chen et al. | 725/93 |
| 2011/0231867 | A1 * | 9/2011 | Williams et al. | 725/5 |

\* cited by examiner

*Primary Examiner* — Nathan Flynn
*Assistant Examiner* — Omar S Parra

(57) ABSTRACT

A method including providing content to one or more customer premises equipment (CPEs); receiving a content request for content from a requesting CPE; determining whether the content is already being delivered to at least one of the one or more CPEs; selecting a primary CPE to satisfy the content request when it is determined that the content is already being delivered to the at least one of the one or more CPEs; providing a network address of the primary CPE to the requesting CPE; and providing the content from the primary CPE to the requesting CPE.

20 Claims, 16 Drawing Sheets

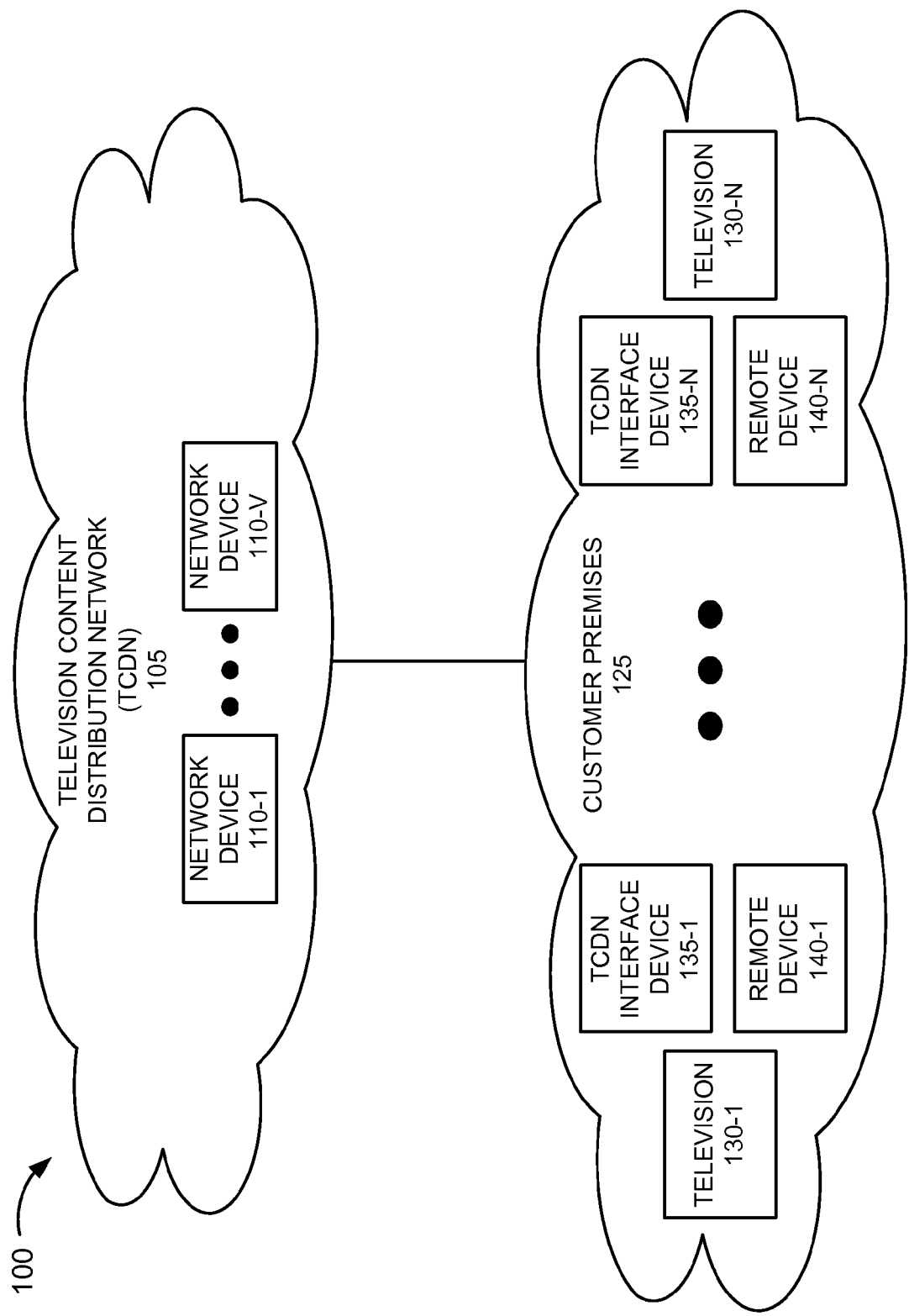

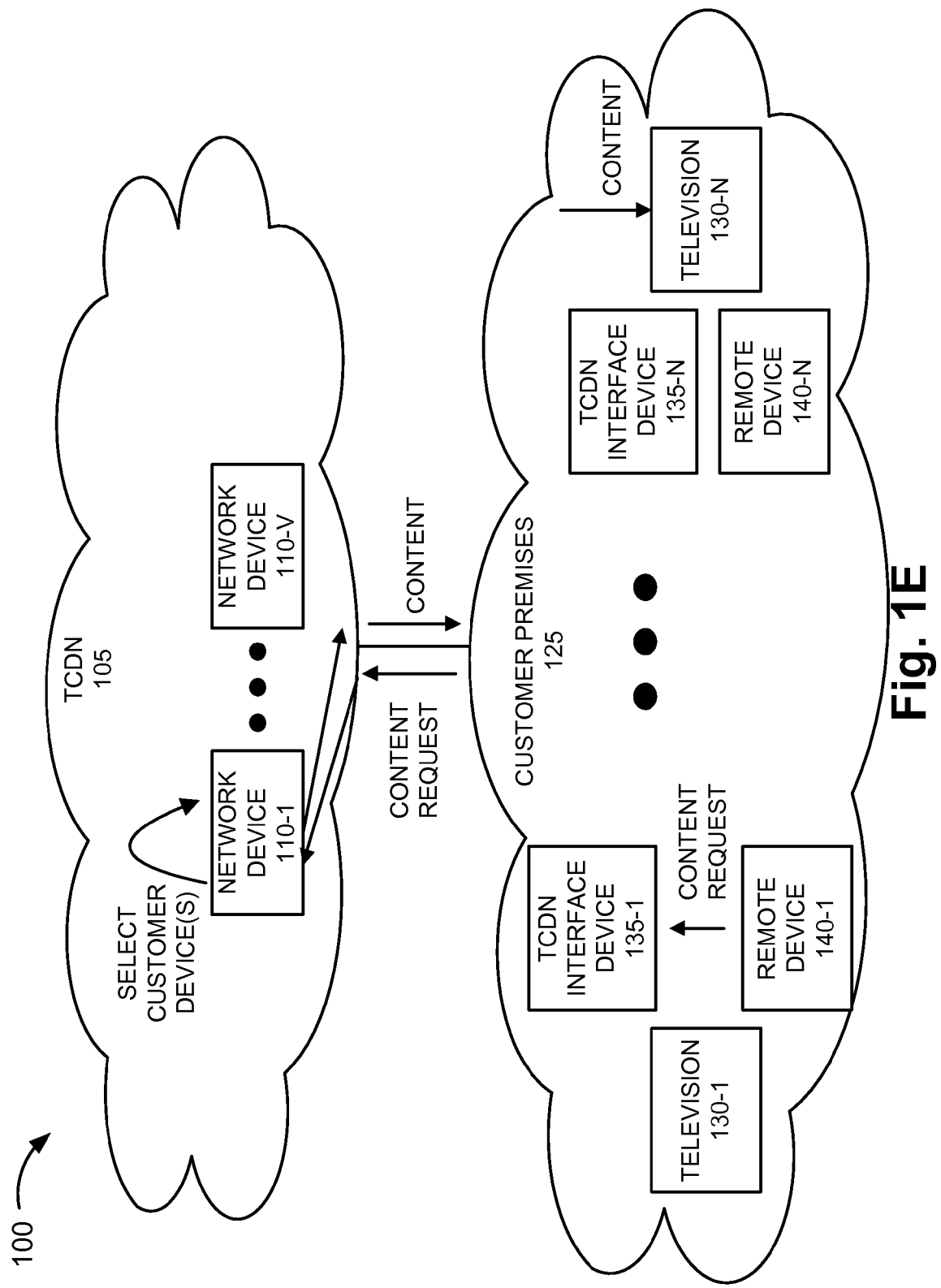

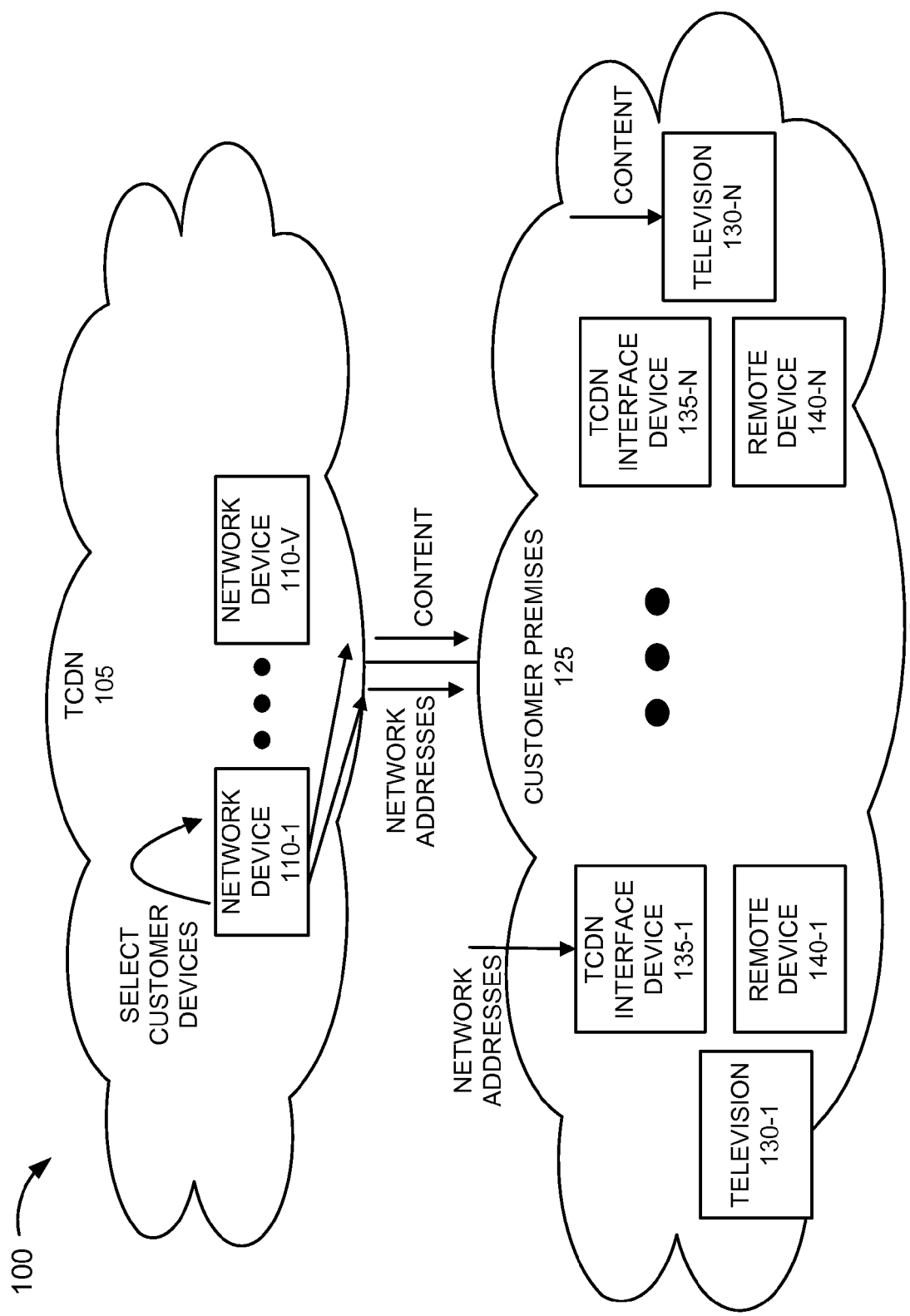

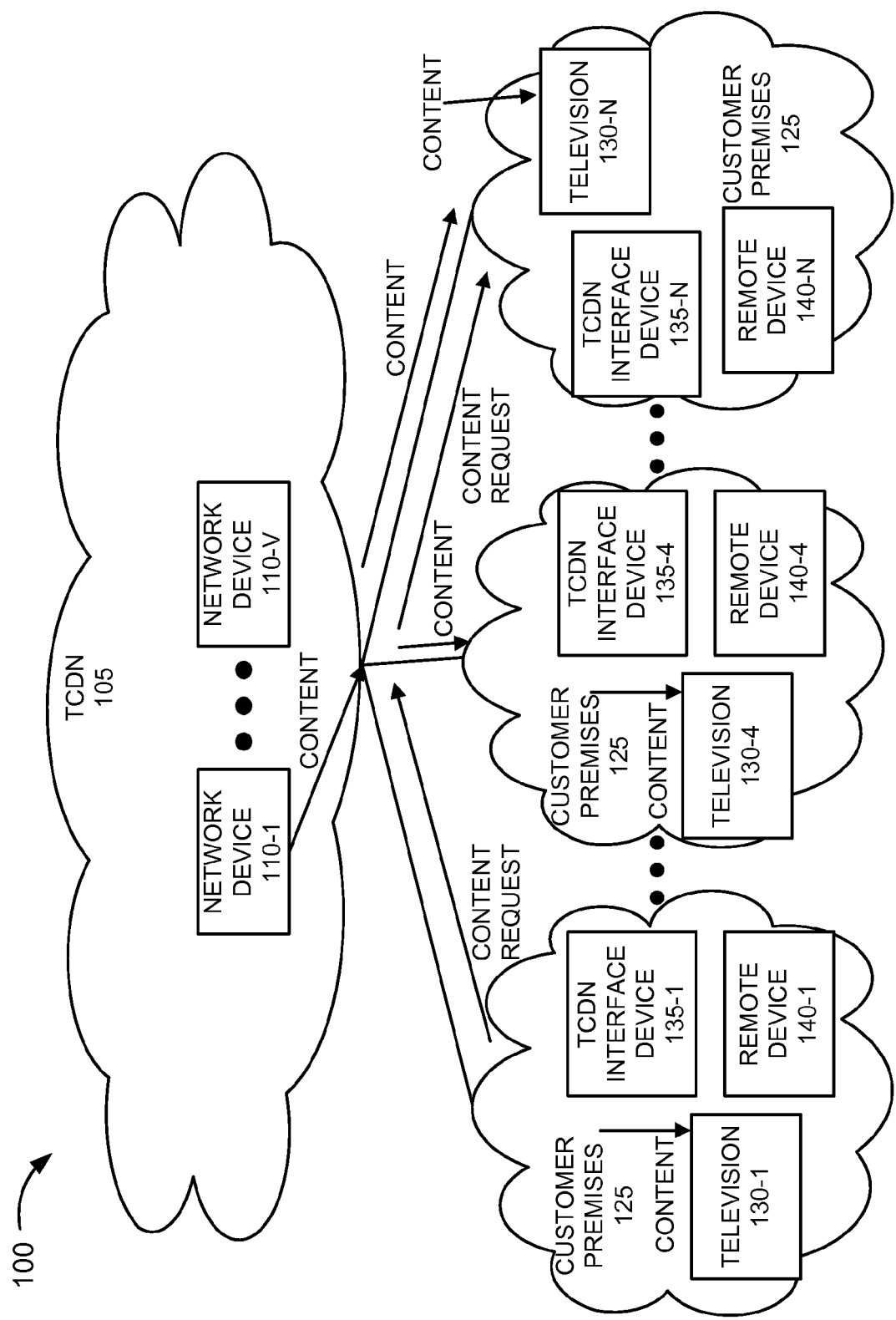

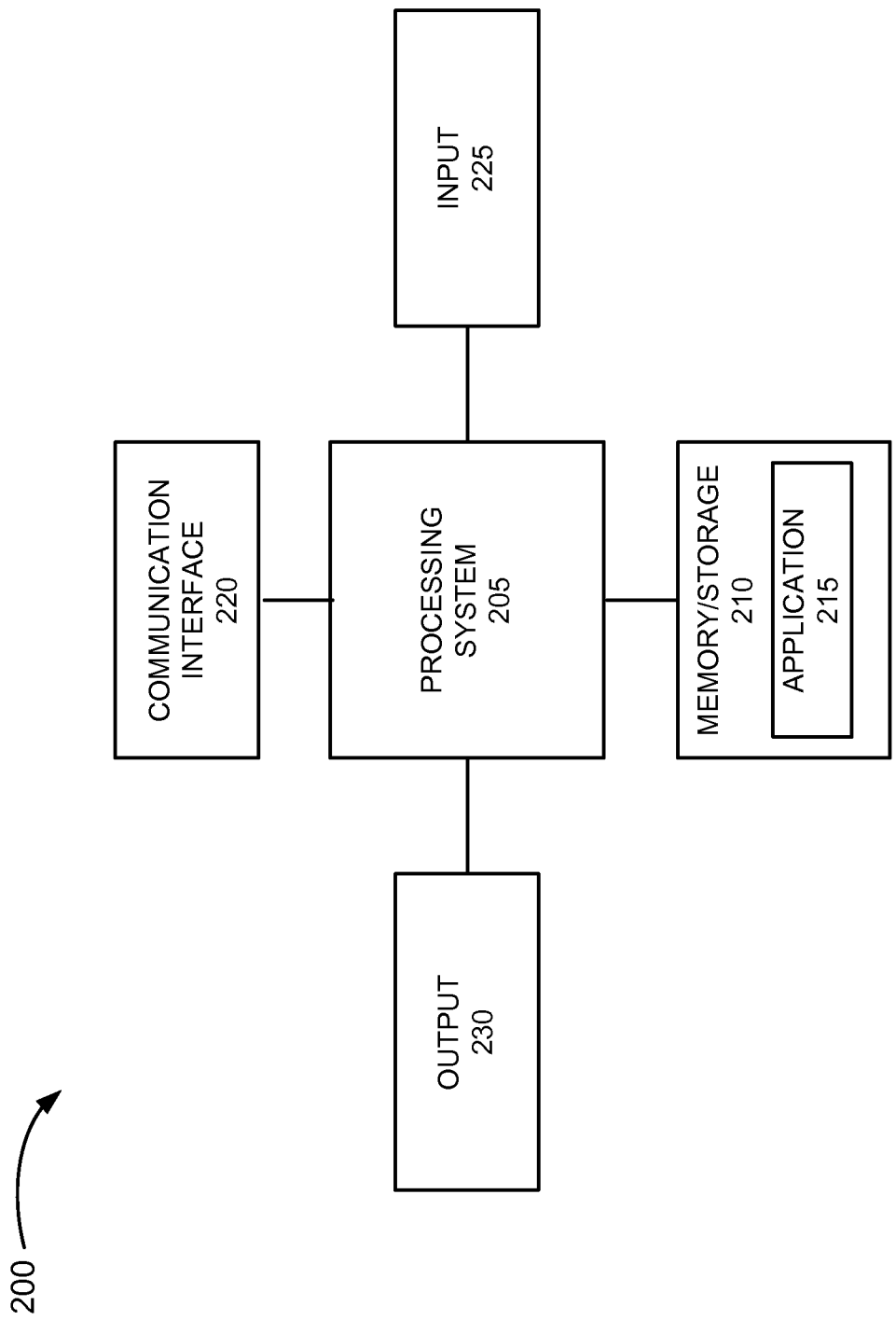

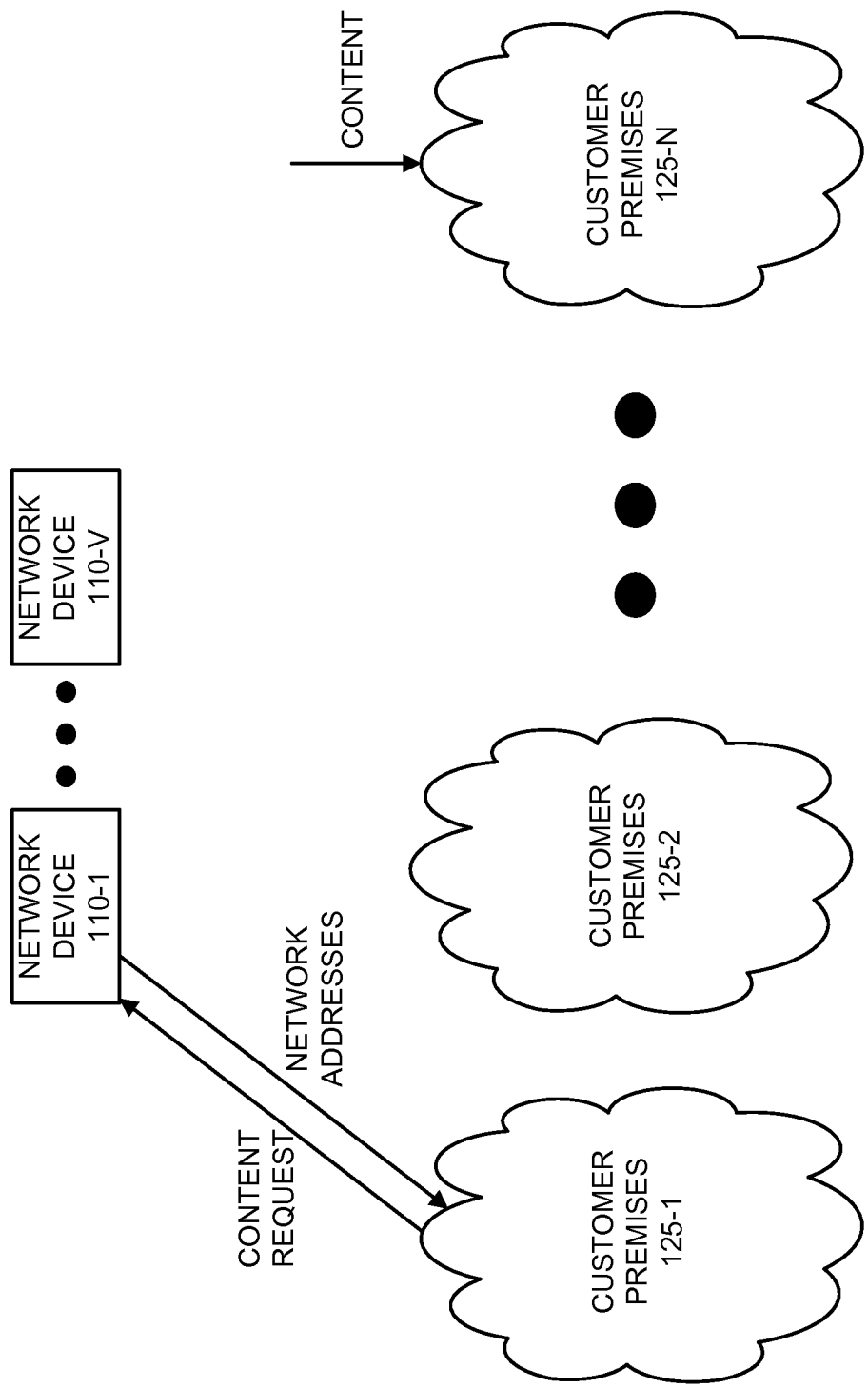

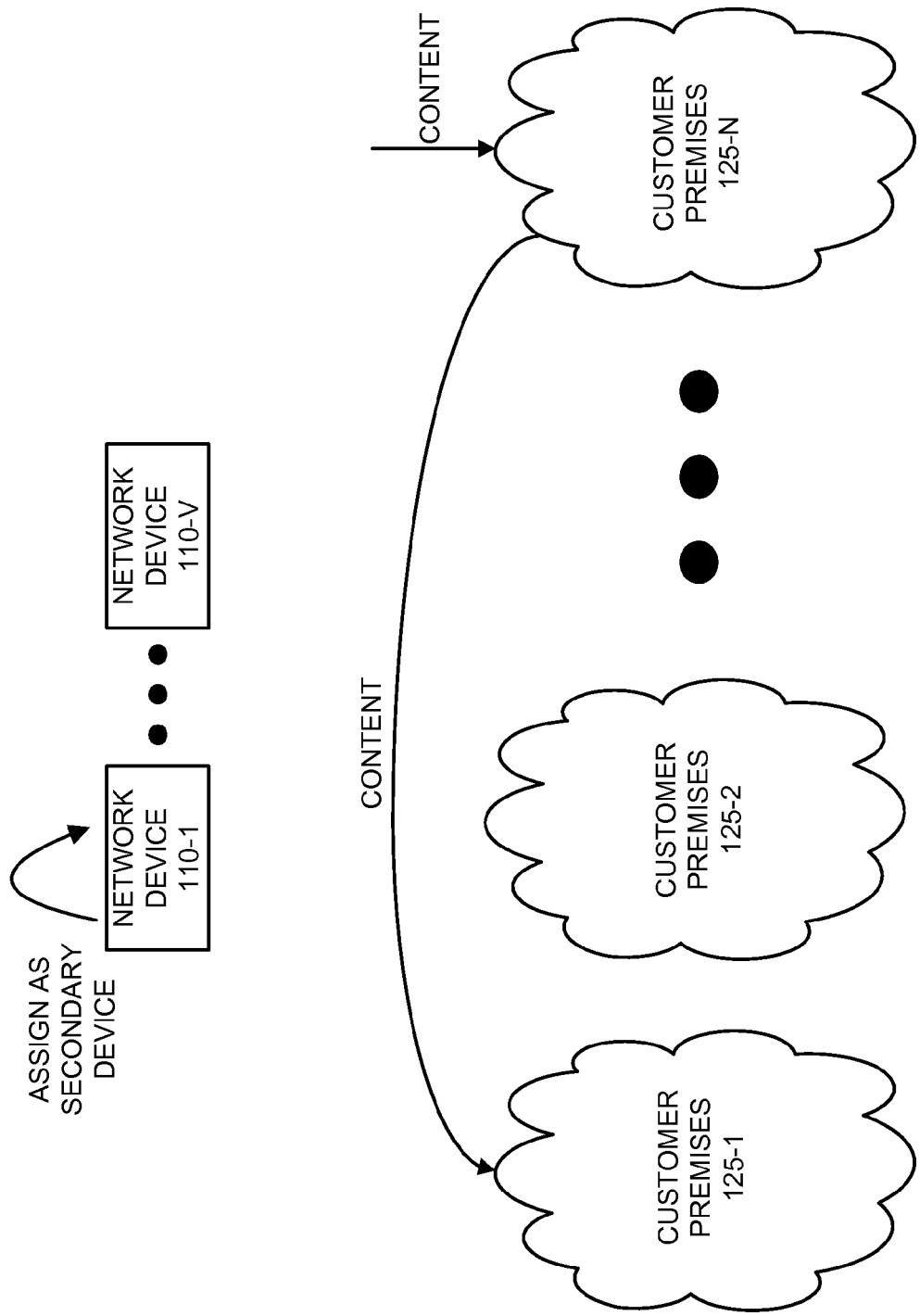

EFFICIENT BANDWIDTH UTILIZATION

BACKGROUND

Channel capacity and bandwidth utilization are considerations that network providers and service providers recognize. For example, television service providers (TSPs) have limited channel capacity to deliver channels to their customers.

BRIEF DESCRIPTION OF THE DRAWINGS

FIG. 1A is a diagram illustrating an exemplary environment in which an exemplary embodiment for providing bandwidth-efficient delivery of content may be implemented;

FIGS. 1B-1H are diagrams illustrating an exemplary process for providing content based on bandwidth-efficient measures according to an exemplary embodiment;

FIG. 2 is a diagram illustrating exemplary components of a device that may correspond to one or more of the devices in the exemplary environment;

FIGS. 3A-3E are diagrams illustrating an exemplary process for providing bandwidth-efficient delivery of content.

DETAILED DESCRIPTION OF PREFERRED EMBODIMENTS

Figure 1B:
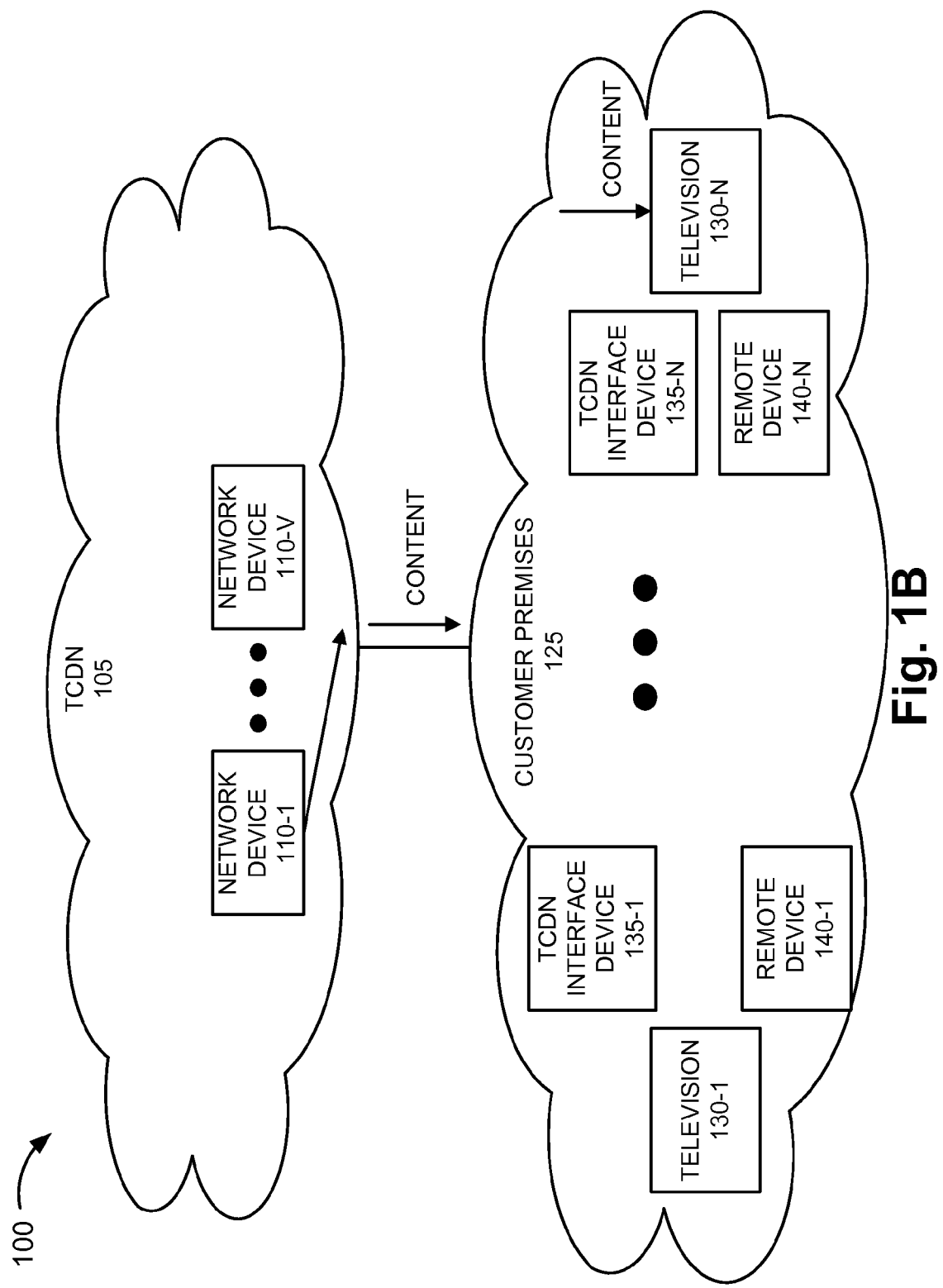

The following detailed description refers to the accompanying drawings. The same reference numbers in different drawings may identify the same or similar elements. Also, the following detailed description does not limit the invention.

The term "content" as used herein, is intended to be broadly interpreted to include, for example, visual data or visual data and audio data, such as media content and user interfaces (UIs). By way of example, content may include television programming (e.g., local programming, national programming, free programming, live-programming (e.g., a live broadcast, etc.), etc.), movies, sports, news, video-on-demand content, premium channel content, television guides, weather information, sports information, traffic information, horoscope information, games, Internet content, etc. The content may be in various formats, such as, for example, standard definition, high-definition, 3-D, etc.

TSPs have limited resources for delivering content to their customers. For example, content delivery architectures may reach its capacity due to the number of channels, etc. Under such circumstances, for example, the addition of new channels or the offering of high-definition channels may cause channel capacity to become depleted. TSPs may use Internet Protocol Television (IP TV) to supplement their delivery of content to their customers.

According to exemplary embodiments described herein, a television content distribution network (TCDN) may include the use of IP channels to deliver content (e.g., IP TV, etc.). According to the exemplary embodiments, the TCDN may include network devices that provide the content to customer devices based on bandwidth-efficient measures. According to an exemplary embodiment, when the network devices receive a request for an IP channel, the network devices may determine whether the request may be satisfied by a customer device that is already receiving the IP channel. If the network devices determine that the other customer device may provide the IP channel to the customer device that is making the request, the requesting customer device may receive the IP channel from the other customer device. In this way, the bandwidth between the network devices and customer devices may be efficiently used, etc.

According to an exemplary embodiment, the network devices may provide the requesting customer device a network address of the customer device already receiving the requested content. According to an exemplary embodiment, the network devices may provide the requesting customer device the network address of the customer device and a network address of a secondary customer device. The secondary customer device may be considered a backup device in case the customer device is unable to provide the requested content to the requesting customer device due to device or network failures, etc. According to an exemplary embodiment, in the event that a secondary customer device may not be available, the network devices may act as the backup device.

FIG. 1A is a diagram illustrating an exemplary environment 100 in which an exemplary embodiment for providing bandwidth-efficient delivery of content may be implemented. As illustrated in FIG. 1A, environment 100 may include a TCDN 105 and customer premises 125. TCDN 105 may include, among other devices, multiple network devices 110-1 through 110-V (referred to generally as network device 110 or network devices 110). Customer premises 125 may include, among other devices, televisions (TVs) 130-1 through 130-N (referred to generally as TV 130 or TVs 130), TCDN interface devices 135-1 through 135-N (referred to generally as TCDN interface device 135 or TCDN interface devices 135), and remote devices 140-1 through 140-N (referred to generally as remote device 140 or remote devices 140).

The number of devices and networks, and configuration in environment 100 is exemplary and provided for simplicity. In practice, environment 100 may include additional devices, fewer devices, different devices, and/or differently arranged devices, than those illustrated in FIG. 1A. Additionally, or alternatively, in practice, environment 100 may include additional networks and/or differently arranged networks, than those illustrated in FIG. 1A. Also, one or more functions and/or processes described as being performed by a particular device may be performed by a different device, or some combination of devices, according to other embodiments. Environment 100 may include wired and/or wireless connections among the devices illustrated. By way of example, the connections may include cable, fiber optic, wireless, etc.

TCDN 105 may include a network that distributes or makes available content. TCDN 105 may correspond to a satellite-based network and/or a terrestrial-based network. Although not illustrated, TCDN 105 may include, for example, content distribution devices, content storage devices, etc. According to some exemplary embodiments, for example, TCDN 105 may include a network associated with a TSP. According to some exemplary embodiments, for example, TCDN 105 may include a network such as the Internet, web sites, etc.

Network device 110 may include a network device that delivers content to customers based on bandwidth-efficient measures, as described herein. According to an exemplary embodiment, network device 110 may correspond to a server device. According to other embodiments, network device 110 may correspond to other types of network devices, such as, for example, a routing device, a content storage device, a load balancing device, and/or a network topology-aware device. Network device 110 will be described further below.

Customer premises 125 may include devices that allow customers to receive television services from TCDN 105. As illustrated, customer premises 125 may include exemplary customer premises equipment (CPE), such as, for example, TCDN interface devices 135, televisions 130, and remote devices 140.

TV 130 may include a device to display content. According to an exemplary embodiment, TV 130 may correspond to a television. According to other embodiments, TV 130 may correspond to other types of devices, such as, for example, a monitor, a mobile device having a display, a laptop computer, etc. According to an exemplary embodiment, TV 130 and TCDN interface device 135 may be separate devices, as illustrated in FIG. 1A. According to other embodiments, TV 130 may include TCDN interface device 135 or include some of the functionalities associated with TCDN interface device 135. According to still other embodiments, TV 130 may include TCDN interface device 135, and/or remote device 140.

TCDN interface device 135 may include a device that communicates with TCDN 105 to provide television services and/or content to a user. TCDN interface device 135 may also communicate with TCDN 105 to provide other types of services, assets, resources, etc. For example, TCDN interface device 135 may allow a customer to communicate with other types of networks. According to an exemplary embodiment, TCDN interface device 135 may include a client, a thin client, a set-top box, a converter box, a receiver, a tuner, a digibox, an optical termination point (OTP), an optical network terminal (ONU), a server device, a pedestal, or some other type of CPE. According to an exemplary embodiment, TCDN interface device 135 may also include a digital video recorder (DVR) and/or a hard drive.

Remote device 140 may include a device that communicates with TV 130 and/or TCDN interface device 135 to allow a customer to interact with TCDN interface device 135 and/or TV 130. Remote device 140 may also include a device that communicates with other devices in communication with TV 130 and/or TCDN interface device 135. Remote device 140 may include one or multiple input mechanisms (e.g., buttons, a display, a touchpad, a microphone, etc.) to receive a customer's input and, among other things, select content. According to an exemplary embodiment, remote device 140 may correspond to a remote control device (e.g., a set-top box controller, a TV controller, a converter box controller, etc.). According to other embodiments, remote device 140 may correspond to, for example, a tablet device, a mobile communication device, or some other type of user device. According to still other embodiments, remote device 140 may include TV 130. According to yet other embodiments, remote device 140 may include TV 130 and TCDN interface device 135 or include some of the functionalities associated with TCDN interface device 135.

FIGS. 1B-1H are diagrams illustrating an exemplary process for providing content based on bandwidth-efficient measures according to an exemplary embodiment. While particular messages or information may be illustrated as being sent by or received by a particular device in environment 100, according to other embodiments, the exemplary messages may be sent by or received by a different device or a combination of devices. Additionally, or alternatively, while examples described may refer to a particular protocol, according to other embodiments, other protocols may be used, in addition to, or instead of, that described.

Referring to FIG. 1B, according to an exemplary process, network device 110-1 may be providing content to a customer (not illustrated) that is watching TV 130-N. According to an exemplary embodiment, the content may be delivered to TV 130-N using an IP channel.

Figure 1C:
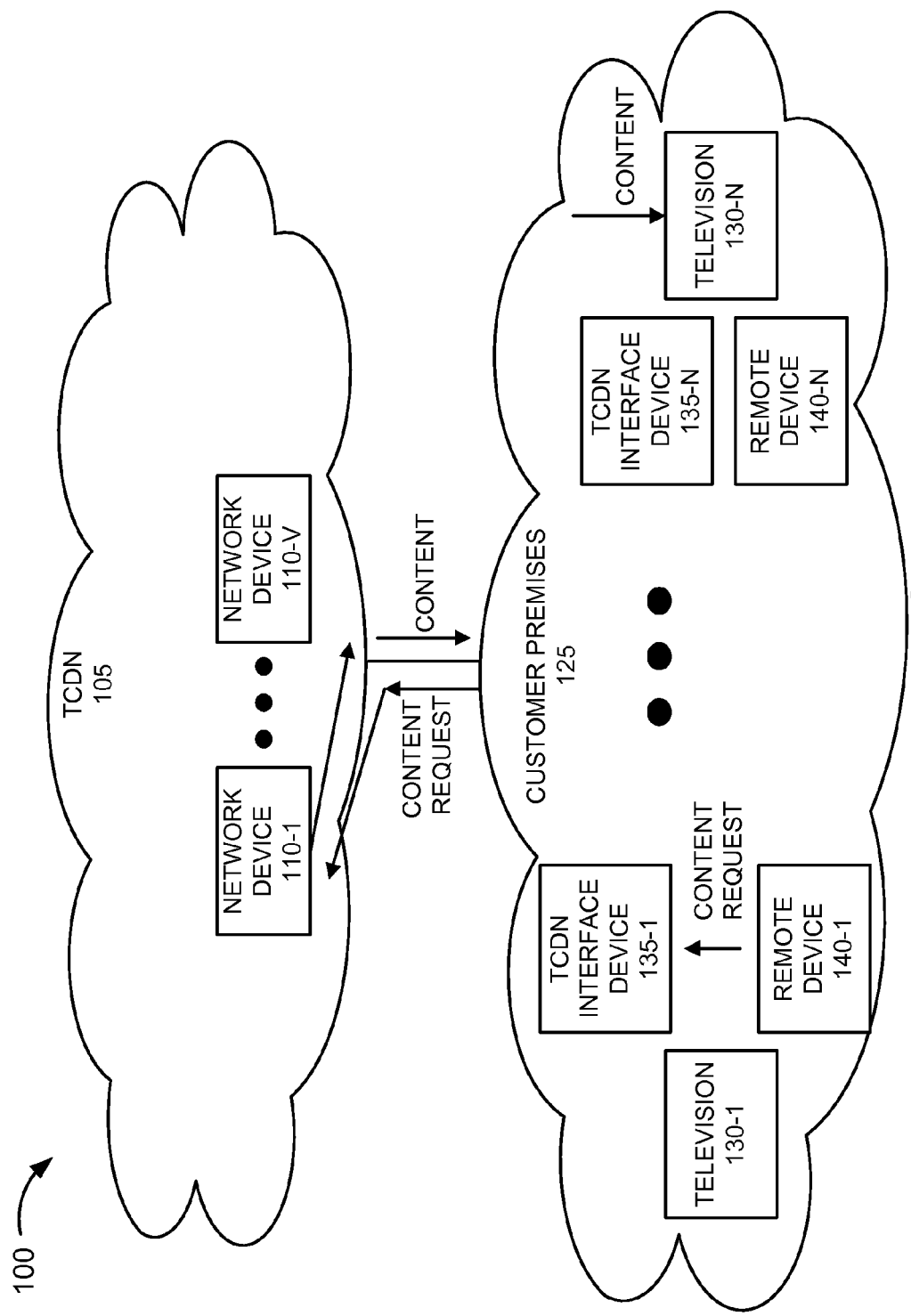
Figure 1D:
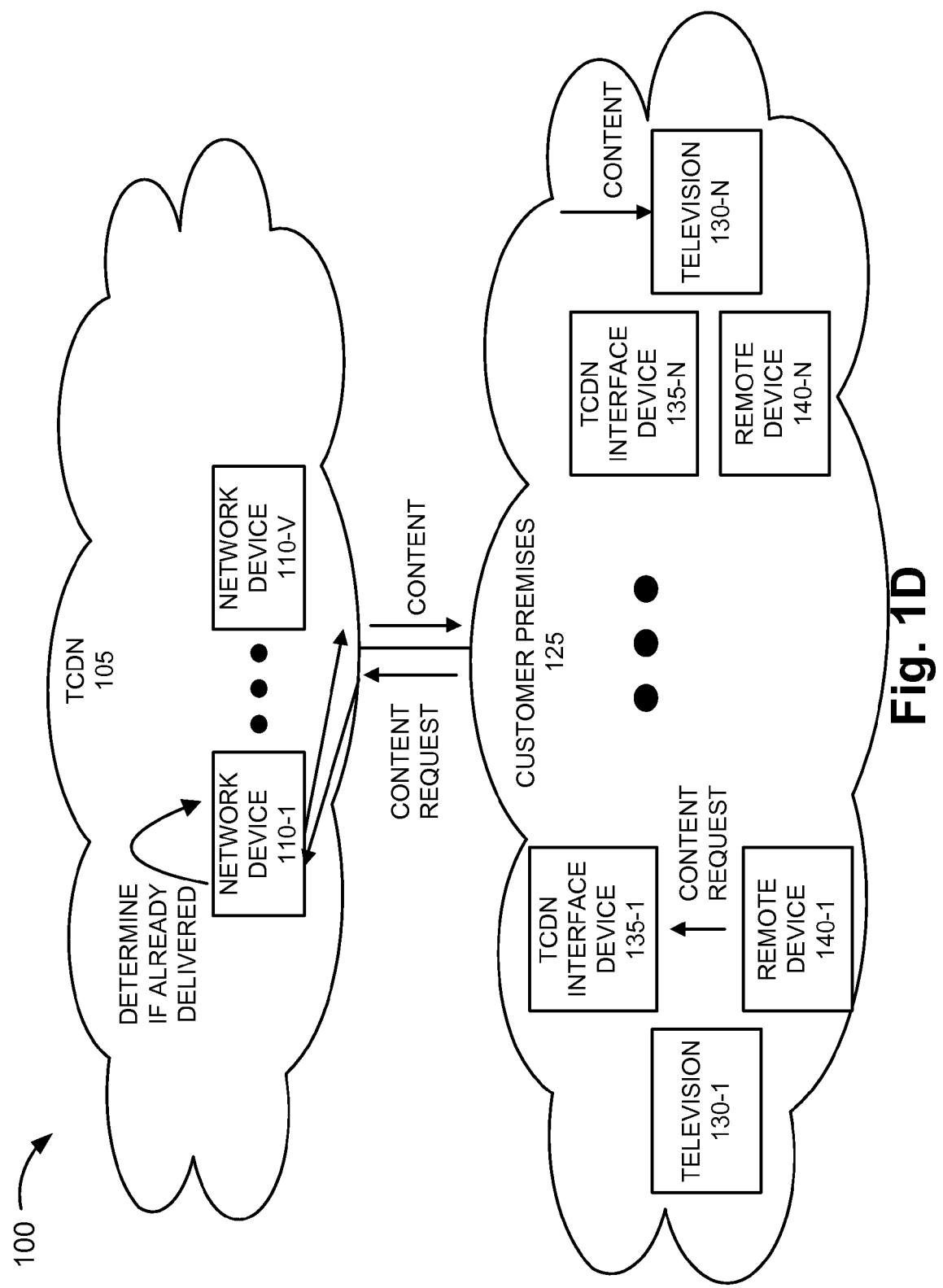

In FIG. 1C, another customer (not illustrated) may request the same content. For example a content request may be sent by the other customer via TCDN interface 135-1 to network device 110-1. Network device 110-1 may receive the content request. Referring to FIG. 1D, network device 110-1 may determine whether the content is already being delivered to another CPE. By way of example, network device 110-1 may determine whether another TCDN interface device 135 is receiving the requested content. In this example, network device 110-1 may determine, among other CPEs, that TCDN interface 135-N is receiving the content requested.

As illustrated in FIG. 1E, network device 110-1 may select one or more TCDN interface devices 135 based on performance metrics, such as, for example, hop count, latency, etc., (e.g., between TCDN interface device 135-1 and other TCDN interface devices 135, etc.), network topology information, network state information, network cost information, bandwidth utilization, and/or network optimization parameters. According to an exemplary embodiment, network device 110-1 may select a primary TCDN interface device 135 to deliver the requested content to the requesting TCDN interface device 135-1. According to another exemplary embodiment, network device 110-1 may select a primary TCDN interface device 135 and a secondary TCDN interface device 135. According to an exemplary embodiment, in the event a primary TCDN interface device 135 is not available, network device 110-1 may provide the content to TCDN interface device 135-1. According to an exemplary embodiment, in the event a secondary TCDN interface device 135 is not available, network device 110-1 may act as the secondary/backup device. According to an exemplary embodiment, in the event that a primary TCDN interface device 135 and a secondary TCDN interface device 135 are selected and the primary TCDN interface device 135 fails, the secondary TCDN interface device 135 may take over as the primary TCDN interface device 135. Further, network device 110-1 may select another secondary TCDN interface device 135.

In this example, it may be assumed that network device 110-1 is able to select a primary TCDN interface device 135 and secondary TCDN interface device 135. According to an exemplary embodiment, as illustrated in FIG. 1F, network device 110-1 may send the network addresses of the primary and the secondary TCDN interface devices 135 to TCDN interface device 135-1. For example, with reference to FIG. 1G, TCDN interface devices 135-4 and 135-N may be receiving the requested content (e.g., from network device 110-1, from another TCDN interface device 135, etc.). In this example, TCDN interface device 135-N may correspond to the primary TCDN interface device 135 and TCDN interface device 135-4 may correspond to the secondary TCDN interface device 135.

According to an exemplary embodiment, TCDN interface device 135-1 may make a content request to TCDN interface device 135-N based on the network address received. TCDN interface device 135-1 may send a content request to TCDN interface device 135-4 when TCDN interface device 135-1 is no longer receiving the requested content from TCDN interface device 135-N (e.g., due to device failure, network failure, etc.). For example, TCDN interface device 135-1 may send the content request after a timeout procedure.

Figure 1H:
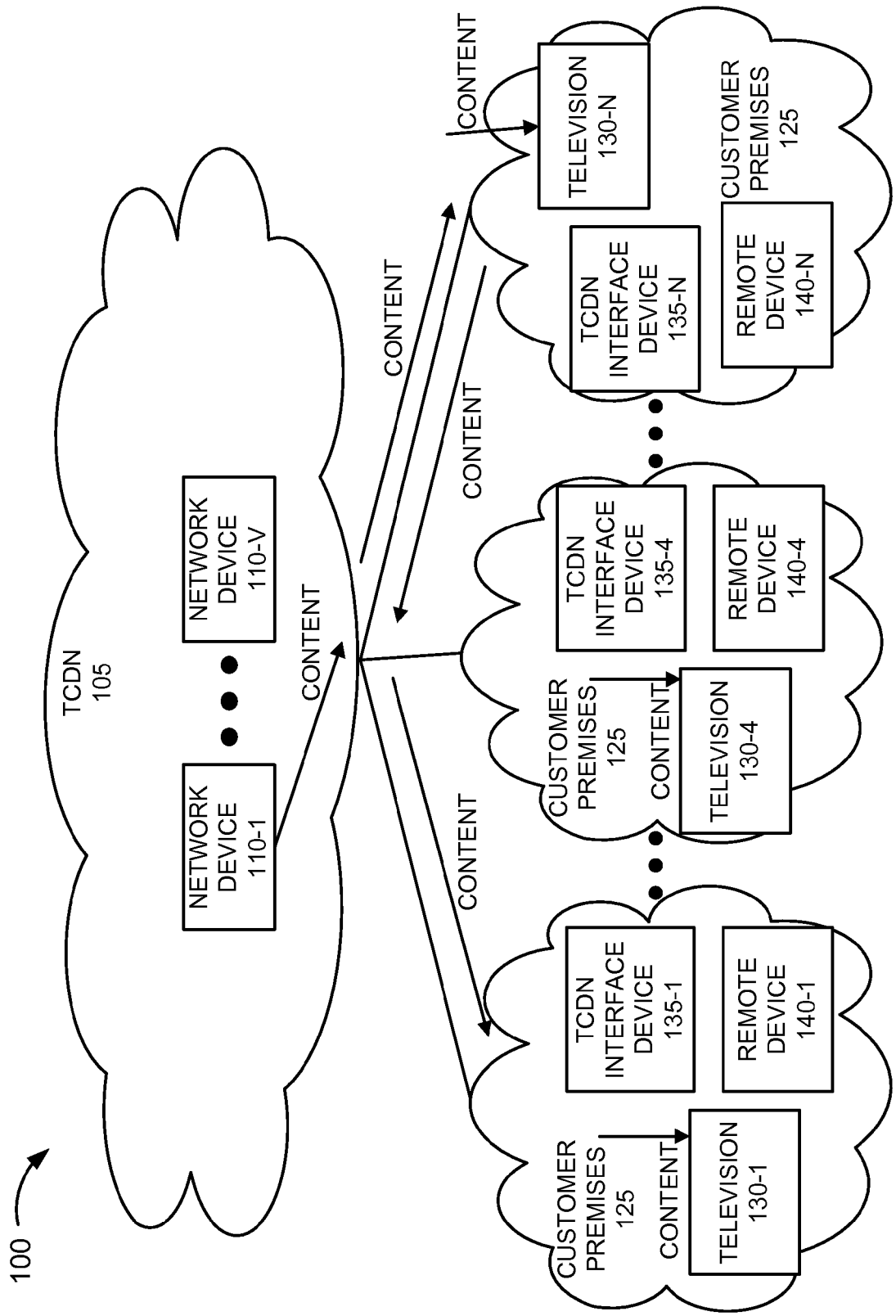

As illustrated in FIG. 1H, TCDN interface device 135-N may provide the requested content to TCDN interface device 135-1. In this way, among other things, the bandwidth between network devices 110 and customer devices may be efficiently used, etc.

According to other embodiments, TCDN interface device 135-N and/or TCDN interface device 135-4 may receive the network address of TCDN interface device 135-1. For example, network device 110-1 may provide the network address to these devices. According to such embodiments, TCDN interface device 135-N may initiate communication with TCDN interface 135-1 to provide the requested content to TCDN interface device 135-1.

FIG. 2 is a diagram illustrating exemplary components of a device 200 that may correspond to one or more of the devices in environment 100. For example, device 200 may correspond to network device 110, TV 130, TCDN interface device 135, and/or remote device 140. As illustrated, according to an exemplary embodiment, device 200 may include a processing system 205, memory/storage 210 including an application 215, a communication interface 220, an input 225, and an output 230. According to other embodiments, device 200 may include fewer components, additional components, different components, and/or a different arrangement of components than those illustrated in FIG. 2 and described herein.

Processing system 205 may include one or multiple processors, microprocessors, data processors, co-processors, application specific integrated circuits (ASICs), controllers, programmable logic devices, chipsets, field programmable gate arrays (FPGAs), application specific instruction-set processors (ASIPs), system-on-chips (SOCs), and/or some other component that may interpret and/or execute instructions and/or data. Processing system 205 may control the overall operation or a portion of operation(s) performed by device 200. Processing system 205 may perform one or multiple operations based on an operating system and/or various applications (e.g., application 215). Processing system 205 may access instructions from memory/storage 210, from other components of device 200, and/or from a source external to device 200 (e.g., a network, another device, etc.).

Memory/storage 210 may include one or multiple memories and/or one or multiple storage mediums. For example, memory/storage 210 may include a random access memory (RAM), a dynamic random access memory (DRAM), a read only memory (ROM), a programmable read only memory (PROM), a flash memory, a phase-change memory (PCM), and/or some other type of storing medium (a computer-readable medium, a compact disk (CD), a digital versatile disk (DVD), etc.). Memory/storage 210 may include a hard disk (e.g., a magnetic disk, an optical disk, a magneto-optic disk, a solid state disk, etc.) or some other type of storing medium, along with a corresponding drive. Memory/storage 210 may be external to and/or removable from device 200, such as, for example, a Universal Serial Bus (USB) memory, a dongle, a hard disk, mass storage, off-line storage, etc.

The term "computer-readable medium," as used herein, is intended to be broadly interpreted to include, for example, a memory, a secondary storage, a CD, a DVD, or another type of tangible storing medium. Memory/storage 210 may store data, application(s), and/or instructions related to the operation of device 200.

Application 215 may include software that provides various services and/or functions. For example, with reference to network device 110 and according to an exemplary embodiment, application 215 may include one or multiple applications for performing one or more of the processes described herein, such as, for example, determining whether content is being delivered to another CPE, selecting primary and/or secondary CPEs, managing network topology information, etc. Additionally, for example, with reference to CPEs, such as, for example, TCDN interface device 135, and according to an exemplary embodiment, application 215 may include one or multiple applications for performing one or more of the processes described herein, such as, for example, providing content to another CPE.

Communication interface 220 may permit device 200 to communicate with other devices, networks, systems, etc. Communication interface 220 may include one or multiple wireless interfaces and/or wired interfaces. Communication interface 220 may include one or multiple transmitters, receivers, and/or transceivers. Communication interface 220 may operate according to one or multiple protocols, standards, and/or the like.

Input 225 may permit an input into device 200. For example, input 225 may include a keyboard, a mouse, a microphone, a display, a touchpad, a button, a switch, an input port, voice recognition logic, fingerprint recognition logic, a web cam, and/or some other type of visual, auditory, tactile, etc., input component. Output 230 may permit an output from device 200. For example, output 230 may include a speaker, a display, a light, an output port, and/or some other type of visual, auditory, tactile, etc., output component.

As described herein, device 200 may perform processes in response to processing system 205 executing software instructions (e.g., application 215) stored by memory/storage 210. By way of example, the software instructions may be read into memory/storage 210 from another memory/storage or from another device via communication interface 220. The software instructions stored by memory/storage 210 may cause processing system 205 to perform one or more processes described herein. Alternatively, for example, according to other implementations, device 200 may perform one or more processes described herein based on the execution of hardware (processing system 205, etc.), the execution of hardware and firmware, or the execution of hardware, software, and firmware.

As previously described, according to exemplary embodiments, network devices may provide content to customer devices based on bandwidth-efficient measures. A further description of bandwidth-efficient processes is described with reference to FIGS. 3A-3E.

According to an exemplary embodiment, network device 110 may provide content to customer premises 125 (e.g., customer premises 125-1 through 125-N). According to other embodiments, customer premises 125 may be provided content from another customer premises 125 or within the same customer premises 125 (e.g., within a household having multiple TCDN interface devices, etc.).

Figure 3A:
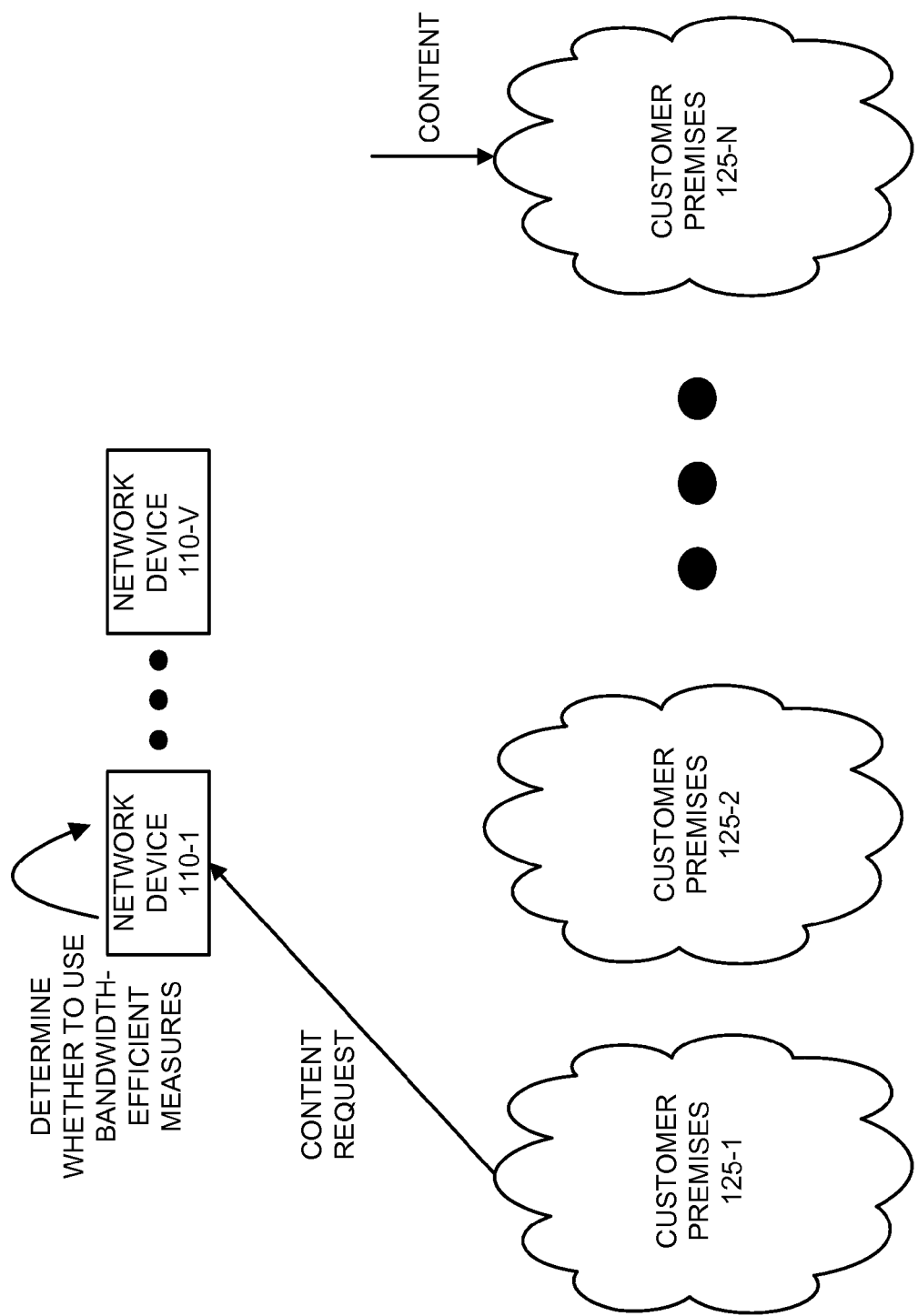

As illustrated in FIG. 3A, customer premises 125-N may be receiving content. Customer premises 125-1 may send a content request to network device 110-1. According to an exemplary embodiment, when network device 110-1 receives the content request, network device 110-1 may determine whether to use bandwidth-efficient measures. By way of example, network device 110-1 may consider available bandwidth (e.g., is the available bandwidth higher or lower than a threshold value, etc.), as well as one or more of the following factors, such as, load balancing/network optimization parameters (e.g., associated with network device 110-1 delivering the content or another CPE), network topology/network state information (e.g., are there available CPEs, hop count, latency, quality of service (QoS), failures, outages, are available CPEs receiving content from network device 110 or another CPE, etc.), network cost, etc.

Figure 3B:
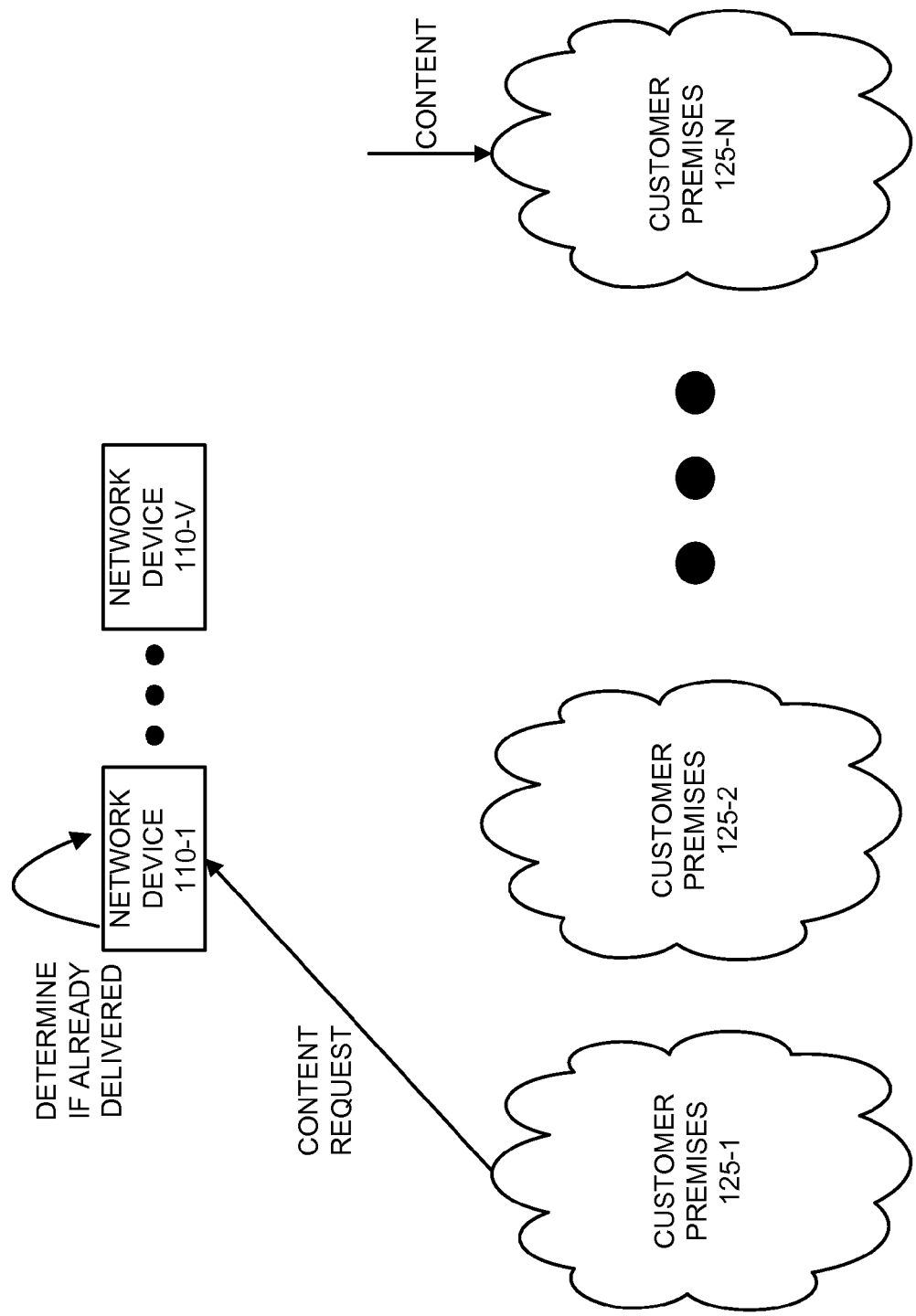

As illustrated in FIG. 3B, when network device 110-1 determines that bandwidth-efficient measures may be taken, network device 110-1 may determine whether the requested content is already being delivered to another customer premises 125 or within the same customer premises 135. For example, network device 110-1 may manage a database that maps content with network addresses. Alternatively, another device (not illustrated) may provide this information to network device 110-1. Network device 110-1 may also determine whether the customer premises 125 (e.g., customer premises 125-N) is receiving the content from network device 110-1, from another customer premises 125, etc. For example, there may be equipment limitations associated with the CPEs, QoS issues, etc., related to daisy-chaining CPEs for the delivery of the requested content.

Figure 3C:
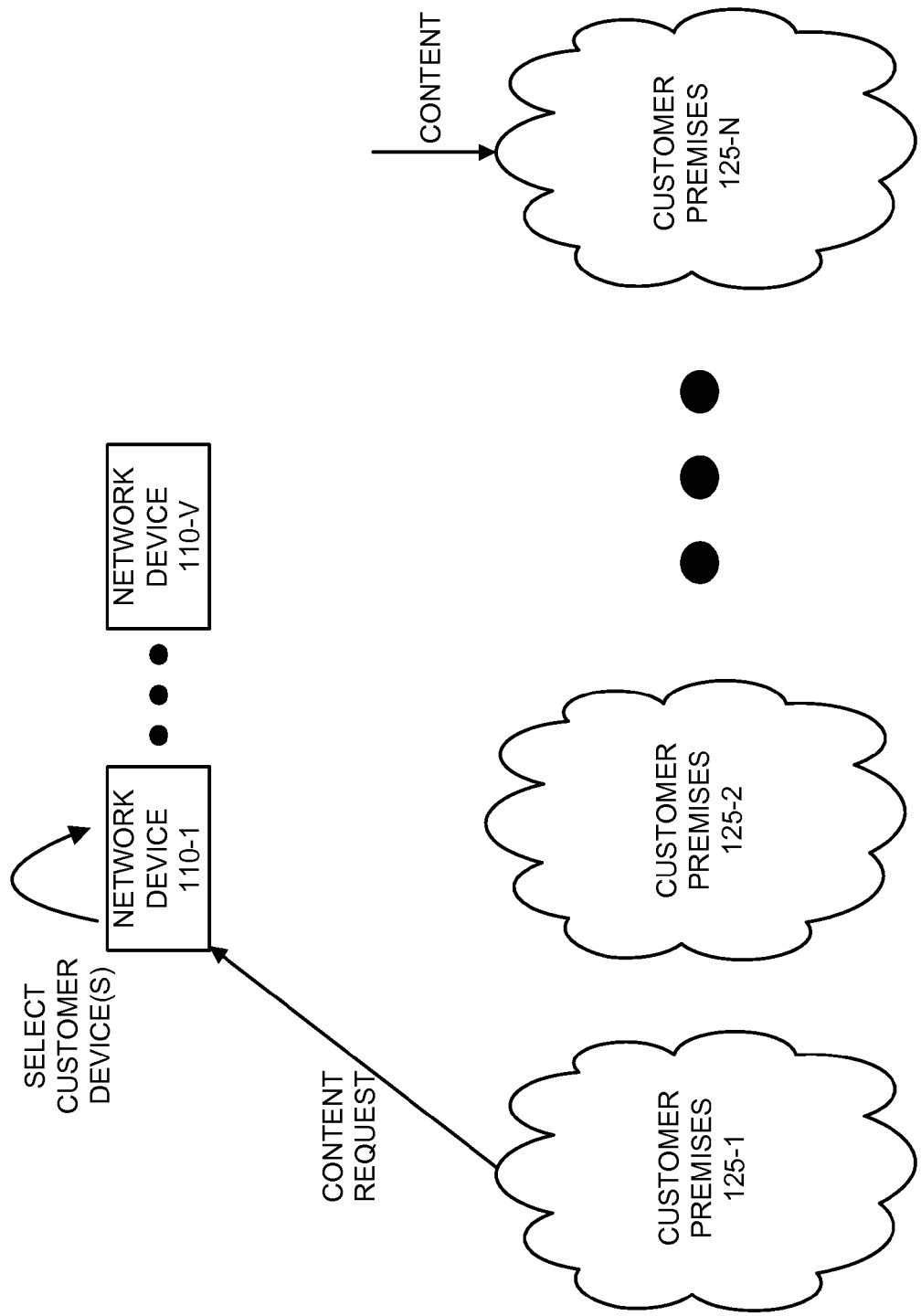

Additionally, referring to FIG. 3C, network device 110-1 may select appropriate customer device(s). For example, according to an exemplary embodiment, network device 110-1 may consider load balancing/network optimization parameters, network topology/network state information, etc. As previously described, according to an exemplary embodiment, network device 110-1 may select a primary and a secondary CPE. In the event that a secondary CPE is not available, network device 110-1 may act as a backup device. As illustrated in FIG. 3D, according to an exemplary embodiment, network device 110-1 may provide the network addresses of the primary CPE and the secondary CPE to customer premises 125-1. In this example, the primary CPE may be associated with customer premises 125-N and the secondary CPE may correspond to network device 110-1, as illustrated in FIG. 3E. In the event that the primary CPE is unable to provide the requested content, network device 110-1 may provide the content. Alternatively, network device 110-1 may determine whether another secondary CPE is available.

Described below are exemplary processes associated with the bandwidth-efficient delivery of content.

Figure 4A:
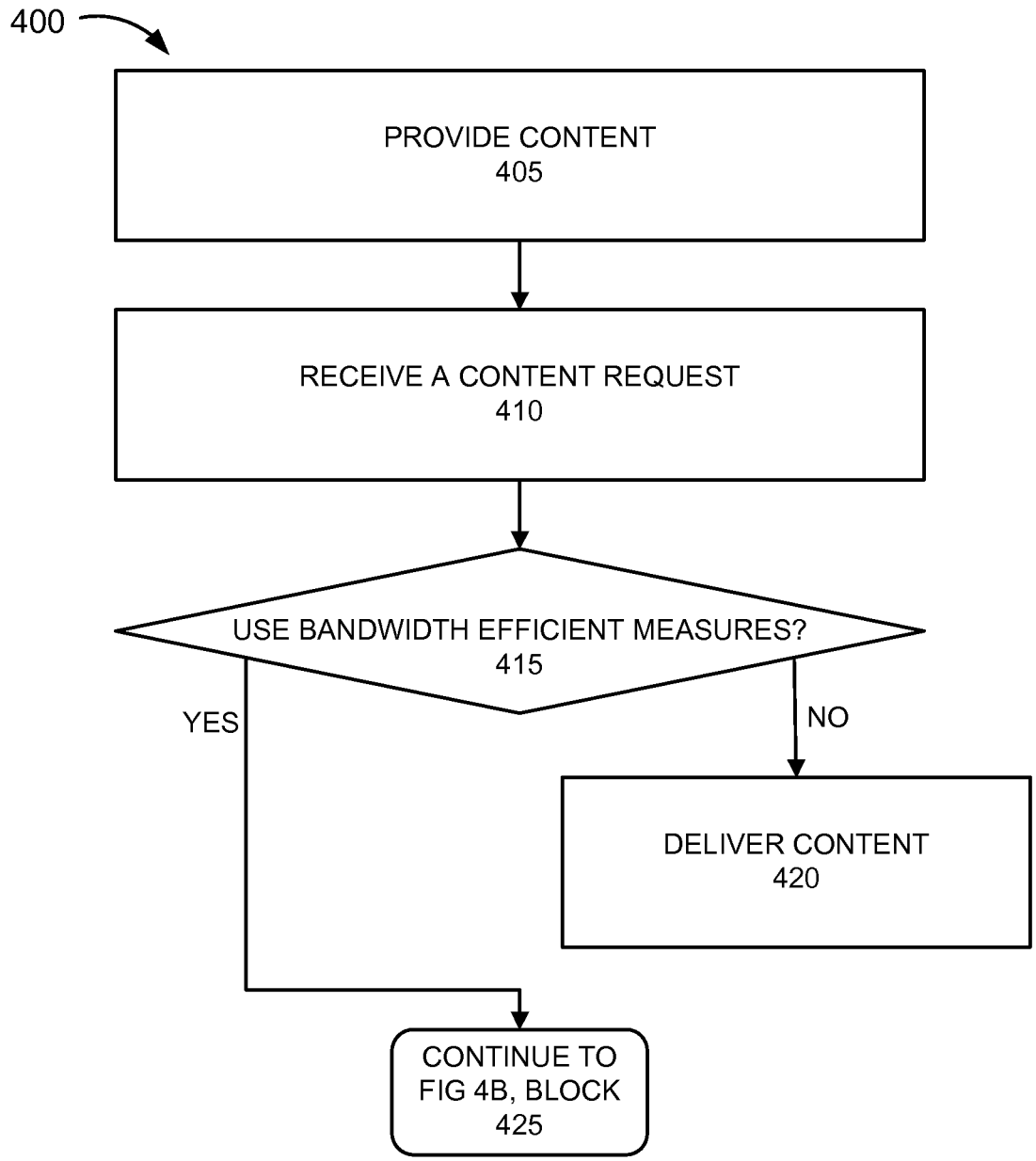
FIGS. 4A and 4B are flow diagrams illustrating an exemplary process for providing bandwidth-efficient delivery of content.
Figure 4B:
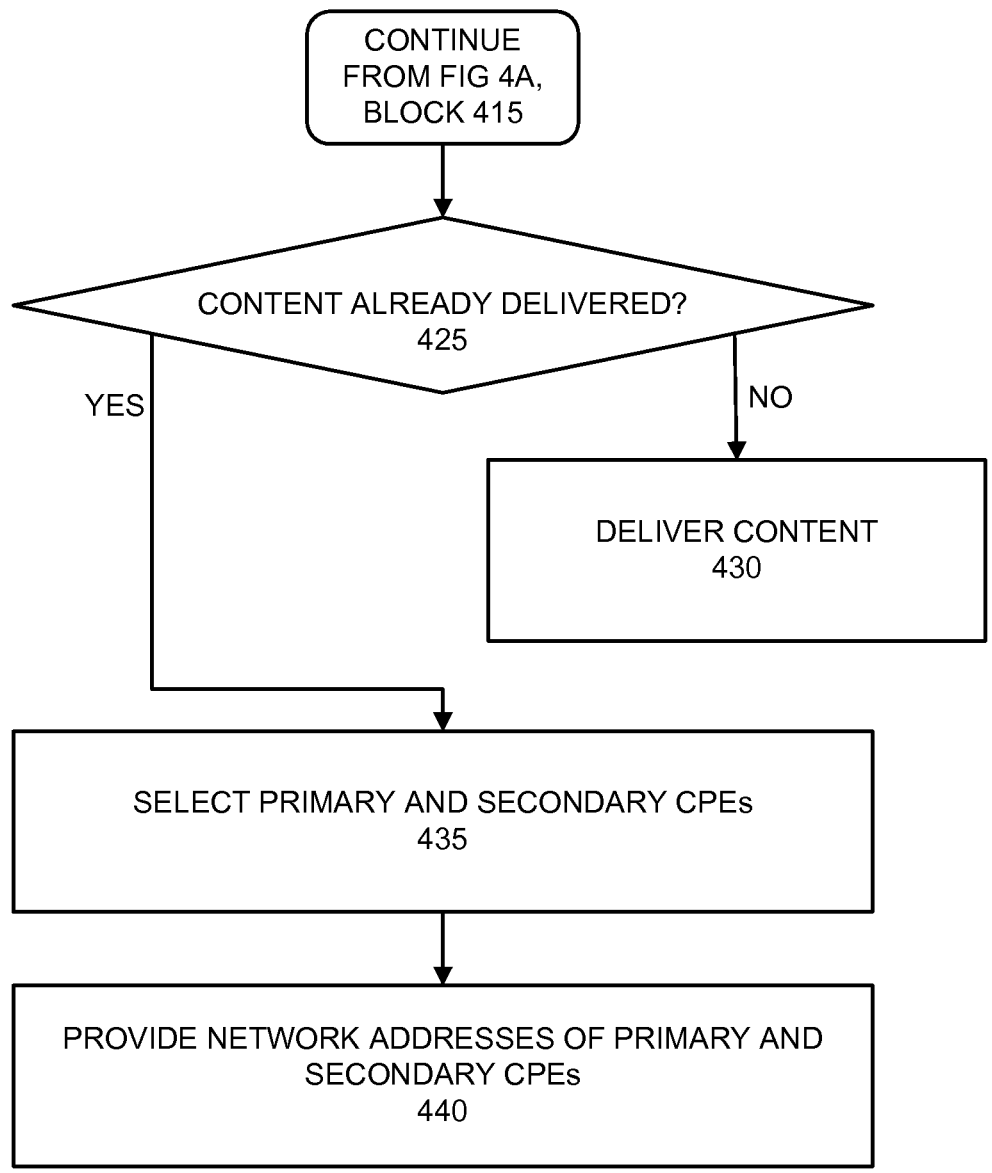

FIGS. 4A and 4B are flow diagrams illustrating an exemplary process 400 for providing bandwidth-efficient delivery of content.

Television content may be provided to customers (block 405). For example, as previously described, network device 110 may deliver content to customers. According to an exemplary embodiment, the content may correspond to IP channel content. In some instances, the content may also be delivered by other CPEs.

A content request may be received (block 410). For example, as previously described, network device 110 may receive a request for content.

It may be determined whether to use bandwidth-efficient measures (block 415). For example, as previously described, network device 110 may determine whether bandwidth-efficient measures may be used to deliver the requested content. Network device 110 may consider various factors, such as, for example, available bandwidth, network topology, network state, etc.

If it is determined that bandwidth-efficient measures may not be used (block 415-NO), then network device 110 may deliver the requested content to the requesting CPE. If it is determined that bandwidth-efficient measures may be used (block 415-YES), then network device 110 may determine whether the requested content is already being delivered to another CPE, as illustrated in FIG. 4B. For example, network device 110 may determine whether network device 110 is already delivering the requested content to another CPE or another CPE is receiving the requested content from yet another CPE.

If it is determined that the content is not already being delivered (block 425-NO), then network device 110 may deliver the requested content to the requesting CPE. Alternatively, in the event that bandwidth utilization does not permit network device 110 to deliver the content, the content may not be delivered or the delivery of the content may be delayed.

If it is determined that the content is already being delivered (block 425-YES), then network device 110 may select a primary CPE and a secondary CPE to deliver requested content. For example, as previously described, according to an exemplary embodiment, network device 110 may select primary and secondary CPEs based on various factors, such as, for example, network topology, network state, etc. According to other embodiments, network device 110 may not select a secondary CPE. Additionally, according to an exemplary embodiment, network device 110 may select itself to act as a backup device (i.e., a secondary content delivery device).

Network addresses associated with the primary and the secondary CPEs may be provided (block 440). For example, as previously described, according to an exemplary embodiment, network device 110 may provide the requesting CPE with the network addresses of the primary and the secondary CPEs. According to other exemplary embodiments, network device 110 may provide the network address of the requesting CPE to the primary and/or the secondary CPEs.

Although FIGS. 4A and 4B illustrate an exemplary process 400 for providing bandwidth-efficient delivery of content, according to other embodiments, process 400 may include additional operations, fewer operations, and/or different operations than those illustrated in FIGS. 4A and 4B and described. Additionally, while process 400 is described with reference to exemplary devices (e.g., CPE (e.g., TCDN interface device 135, etc.), network device 110, etc.) described in process 400 may be performed by a device or combination of devices other than those specifically mentioned.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks has been described with regard to the process illustrated in FIGS. 4A and 4B, the order of the blocks may be modified in other implementations. Further, non-dependent blocks may be performed in parallel. Additionally, other processes described in this description may be modified and/or non-dependent operations may be performed in parallel.

The embodiments described herein may be implemented in many different forms of software, firmware, and/or hardware. For example, a process or a function may be implemented as "logic" or as a "component." This logic or this component may include hardware (e.g., processing system 205, etc.), a combination of hardware and software (e.g., application 215), a combination of hardware and firmware, a combination of hardware, firmware, and software, or software. The embodiments have been described without reference to the specific software code since software can be designed to implement the embodiments based on the description herein.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow.

The specification and drawings are accordingly to be regarded as illustrative rather than restrictive.

No element, act, or instruction described in the present application should be construed as critical or essential to the implementations described herein unless explicitly described as such.

What is claimed is:

1. A method comprising:
   transmitting, by a network device, a content to one or more customer premises equipment (CPEs);
   receiving, by the network device and during the transmitting, a content request for the content from a requesting CPE;
   determining, by the network device and during the transmitting, whether the content is currently being transmitted by the network device and to at least one of the one or more CPEs;
   selecting, by the network device and during the transmitting, a primary CPE to satisfy the content request in response to determining that the content is currently being transmitted, wherein the primary CPE corresponds to the at least one of the one or more CPEs;
   providing, by the network device and during the transmitting, a network address of the primary CPE to the requesting CPE; and
   transmitting the content from the primary CPE to the requesting CPE as the primary CPE continues to receive the content.

2. The method of claim 1, further comprising:
   selecting a secondary CPE to satisfy the content request based on a failure associated with the primary CPE, wherein the secondary CPE corresponds to at least one of the one or more CPEs;
   providing a network address of the secondary CPE to the requesting CPE; and
   transmitting the content from the secondary CPE to the requesting CPE, when the primary CPE is unable to transmit the content.

3. The method of claim 1, further comprising:
   selecting the primary CPE based on at least one of network topology, network state, or network cost, and wherein the content includes a television program.

4. The method of claim 1, further comprising:
   determining an available bandwidth relative to a threshold value, wherein the available bandwidth relates to a bandwidth associated with the network device that transmits the content to the one or more CPEs; and
   determining whether the content is currently being transmitted in response to determining that the available bandwidth is below the threshold value.

5. The method of claim 1, further comprising:
   determining that the primary CPE is unable to transmit the content;
   determining that a secondary CPE is not available to transmit the content; and
   selecting the network device to transmit the content, in response to determining that the secondary CPE is not available and the primary CPE is unable to transmit the content.

6. The method of claim 1, wherein the primary CPE corresponds to one of an optical termination point, an optical network terminal, a pedestal, a set-top box, or a thin client, and wherein the determining comprises:
   determining whether the content is currently being transmitted to a CPE that is located in a same customer premises as the requesting CPE.

7. The method of claim 1, wherein the determining comprises:
   determining whether the content is currently being transmitted by another CPE; and
   determining whether a device limitation pertaining to the other CPE exists that would prevent the other CPE from satisfying the content request based on determining that the content is currently being transmitted by the other CPE.

8. The method of claim 1, wherein the transmitting the content from the primary CPE comprises:
   transmitting the content that is currently being received by the primary CPE over an Internet Protocol (IP) channel.

9. A device comprising:
   a communication interface;
   a memory that stores instructions; and
   a processor that executes the instructions to:
      transmit, via the communication interface, a content to one or more customer premises equipment (CPEs);
      receive, via the communication interface and during a transmission of the content, a content request for the content from a requesting CPE;
      determine, during the transmission of the content, whether the content is currently being transmitted by the device to at least one of the one or more CPEs;
      select, during the transmission of the content, a primary CPE to satisfy the content request in response to a determination that the content is currently being transmitted, wherein the primary CPE corresponds to the at least one of the one or more CPEs; and
      transmit, via the communication interface and during the transmission of the content, at least one of a network address of the primary CPE to the requesting CPE or a network address of the requesting CPE to the primary CPE.

10. The device of claim 9, wherein the device includes a server device that transmits the content over an Internet Protocol (IP) channel, and the processor that executes the instructions to:
    determine an available bandwidth; and
    determine whether the content is currently being transmitted in response to a determination that the available bandwidth is below a threshold value.

11. The device of claim 9, wherein the processor that executes the instructions to:
    select a secondary CPE to satisfy the content request, in response to a determination that the primary CPE is unable to transmit the content.

12. The device of claim 9, wherein the processor that executes the instructions to:
    select the primary CPE based on at least one of network topology, network state, or network cost.

13. The device of claim 9, wherein the processor that executes the instructions to:
    select the primary CPE based on a quality-of-service that includes latency associated with transmitting the content.

14. The device of claim 9, wherein the processor that executes the instructions to:
    select the device as a backup device to transmit the content to the requesting CPE.

15. The device of claim 9, wherein the processor that executes the instructions to:
    manage a database that maps content to network addresses.

16. A customer premises equipment (CPE) comprising:
    a communication interface;
    a memory that stores instructions; and a processor that executes the instructions to:
send, via the communication interface, a content request for a content to a network device that provides the content;
receive, via the communication interface, a content response that includes a network address associated with another CPE that is currently receiving a transmission of the content from the network device;
send, via the communication interface, another content request to the other CPE based on the network address; and
receive, via the communication interface, a remaining portion of the content from the other CPE during the transmission.

17. The CPE of claim 16, wherein the content is associated with an Internet Protocol channel and is a live broadcast.

18. The CPE of claim 16, wherein the CPE corresponds to one of an optical termination point, an optical network terminal, a pedestal, a set-top box, or a thin client.

19. The CPE of claim 16, wherein the content response includes a network address associated with yet another CPE that is to send the content to the CPE if the other CPE is unable to send the content, wherein the content includes a television program.

20. The CPE of claim 19, wherein the processor that executes the instructions to:
send, via the communication interface, another content request to the yet another CPE when the CPE is unable to receive the content from the other CPE.

* * * * *